United States Patent [19]

Kousaka et al.

[11] Patent Number: 4,767,155
[45] Date of Patent: Aug. 30, 1988

[54] SEAT FOR VEHICLES PROVIDING WITH A THIGH SUPPORTING DEVICE

[75] Inventors: Takayuki Kousaka; Toshio Yoshizawa, both of Akishimashi, Japan

[73] Assignee: Tachikawa Spring Co., LTD, Tokyo, Japan

[21] Appl. No.: 640,788

[22] Filed: Aug. 14, 1984

[30] Foreign Application Priority Data

Aug. 19, 1983 [JP] Japan ................. 58-129110

[51] Int. Cl.$^4$ .............................................. A47C 31/00
[52] U.S. Cl. ........................................ 297/219; 297/284
[58] Field of Search .............. 297/284, 219, 313, 452; 5/465, 470, 490, 448

[56] References Cited

U.S. PATENT DOCUMENTS

| | | | |
|---|---|---|---|
| 1,234,571 | 7/1917 | Robideau | 297/219 X |
| 1,418,940 | 6/1922 | Kutschmar | 297/219 |
| 3,550,953 | 12/1970 | Neale | 297/284 X |
| 3,630,572 | 12/1971 | Homier | 297/219 X |
| 3,883,173 | 5/1975 | Shephard et al. | 297/284 X |
| 3,981,534 | 9/1976 | Wilton | 297/219 |
| 4,324,431 | 4/1982 | Murphy et al. | 297/284 |
| 4,334,709 | 6/1982 | Akiyama et al. | 297/284 |
| 4,401,343 | 8/1983 | Schmidt | 297/284 |

FOREIGN PATENT DOCUMENTS

| | | | |
|---|---|---|---|
| 5990 | 12/1979 | European Pat. Off. | 297/219 |
| 2,736,550 | 2/1979 | Fed. Rep. of Germany | 297/284 |
| 3,024,486 | 1/1982 | Fed. Rep. of Germany | 297/219 |
| 53-15524 | 4/1978 | Japan . | |
| 31835 | 3/1981 | Japan | 297/313 |
| 896090 | 5/1962 | United Kingdom | 297/219 |

Primary Examiner—Peter A. Aschenbrenner
Assistant Examiner—Thomas A. Rendos
Attorney, Agent, or Firm—Oldham, Oldham & Weber Co.

[57] ABSTRACT

A seat for vehicles is described having a thigh support device comprising a seat frame, a movable frame superimposed over and pivotally rotatably secured to the seat frame, an integrally formed cushioning member and a top cover member. The cushioning member has a thigh support portion disposed on the movable frame and a buttocks support portion disposed on the seat frame. Two separately divided side cover sections are defined in the side cover section of the top cover member so as to provide a first side cover section covering the thigh support portion and a second side cover section covering the buttocks support portion with the first and second side cover sections being secured in such a manner that they overlap each other at their respective edge portions.

1 Claim, 2 Drawing Sheets

SEAT FOR VEHICLES PROVIDING WITH A THIGH SUPPORTING DEVICE

BACKGROUND OF THE INVENTION

1. Field of the Invention

The present invention relates to an improvement of a seat for vehicles (automobile) provided with a thigh support device, and more particularly relates to a seat formed by the improved construction of affixing a top cover member on the seat.

2. Description of the Prior Art

As shown in FIG. 1 of the accompanying drawings, a conventional seat for vehicles is composed of a thigh support portion ($a_1$) and a buttocks support portion ($b_1$), both of them being formed independently of each other. According to such conventional seat, the components of the thigh support portion ($a_1$), such as a cushioning member and a top cover member, are necessarily formed independently of those of the buttocks support portion ($b_1$), and consequently the manufacturing of the seat inevitably involves high expense and cost.

In order to eliminate the drawbacks inherent in the construction of the foregoing prior art seat, it has been proposed to integrally form the thigh support portion and the buttocks support portion as, for example, disclosed in Japanese Utility Model Publication No. 53-15524. However, this prior art seat also has a disadvantageous aspect in that the top cover member thereof must necessarily be slackened only in the area corresponding to the thigh support portion in order to permit the easy raising and lowering of the thigh support portion. This causes difficulty in the procedure for affixing the top cover member on the seat and thus limits production efficiency.

SUMMARY OF THE INVENTION

An object of the present invention is to provide a seat for vehicles provided with a thigh support device of a construction wherein the thigh support portion and buttocks support portion thereof are integrally formed so as to permit a simple and convenient affixing of the top cover member on the seat.

In order to achieve the aforementioned object, the present invention provides a construction wherein a movable frame carrying the thigh support portion is rotatably, pivotally fixed to a seat frame carrying the buttocks support portion, and one sheet of top cover member formed together with a cushioning member is mounted on those movable and seat frames, said sheet of top cover member having a side cover section which is so cut as to define a first side cover section for the thigh support portion and a second side cover section for the buttocks support portions, independently of each other, whereby the sloped edge portion of the first side cover section is arragned in such a manner as to overlap the counter sloped edge portion of the second side cover section.

BRIEF DESCRIPTION OF THE DRAWINGS

In the drawings;

FIGS. 2 to 6 shows one embodiment of a seat according to the present invention in which;

FIG. 2 is a perspective view of a seat for vehicles according to the present invention;

FIG. 3 is a side view thereof;

FIG. 4 is a side view of the seat in which the thigh support portion is shown in the raised position;

FIG. 5 is a partially cut-away perspective view showing the major portion of the seat; and, FIG. 6 is a vertical sectional view of the major portion of the seat.

DESCRIPTION OF THE PREFERRED EMBODIMENTS

For a better understanding of the present invention, a conventional seat will be briefly described with reference to FIG. 1 of the accompanying drawings.

Figure 1:
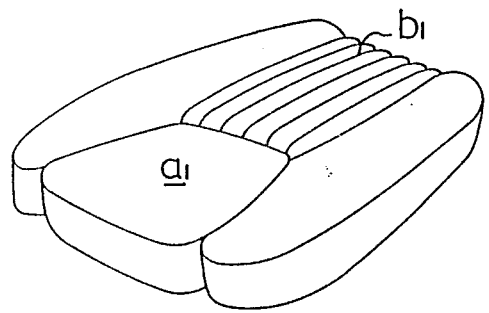
FIG. 1 is a perspective view of a known type of seat.

As illustrated in FIG. 1, a conventional seat is composed of a thigh support portion ($a_1$) and a buttocks support portion ($b_1$). Both of these support portions are formed independently of each other. It is therefore necessary to provide two separate units of components including top cover member, cushioning member, etc., for these support portions.

Figure 2:
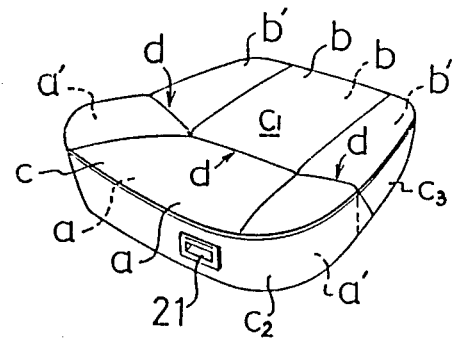

In contrast to the foregoing arrangement, there is provided a seat in accordance with this invention as shown in FIG. 2, in which (a) designates the thigh support portion of the seat and (b) designates the buttocks support portion of same. Both of these support portions comprise a cushioning member, and covering the outer surface thereof is one sheet of one, or a continuously, fabricated sheet of top cover member (c).

Thigh support portion (a) is formed integrally with left and right corner portions (a') and further with buttocks support portion (b). Such integral formation is carried out by forming a foam material together with the top cover member into a desired shape of seat. In like manner, corner potions (b') are formed at the left and right sides of buttocks support portion (b). A frame wire (not shown) is embedded in thigh support portion (a) and buttocks support portoin (b), respectively, such that it is disposed adjacent to the bottom of each said support portion, thereby maintaining a constant rigidity for both said support portions.

Buttocks support portion (b) is mounted on the back part of seat frame (10) and secured thereto by means of bolts.

Movable frame (20) is formed in a substantially U-shaped configuration, with the arragement thereof being such that each of its two lateral frame portions is superimposed over the respective lateral portions of seat frame (10) and pivotally, rotatably secured thereto by means of bolt (20a) allowing the movable frame per se to be rotated freely on bolt (20a). Thus, the pivotal rotation of movable frame (10) serves to raise or lower thigh support portion (a) with respect to buttocks support porton (b).

The thigh support device employed in the present invention is one of conventional type constructed along with the above-described structure. According to this embodiment of the seat shown in FIG. 2, the thigh support device utilized in the present invention is of a type wherein lever means (21) is fixed to movable frame (20) whereby a vertical movement of the lever means causes thigh support portion (a) to be raised and lowered correspondingly.

Top cover member (c) is constructed of one sheet of fabric or one continuously fabricated sheet of fabric, having two cover sections: (1) a central cover and/or edge cover section ($c_1$) which covers the thigh support portion (a) including its corner portions (a') and a buttocks support portion (b) including its corner portion (b'); and (2) a side cover section which is so cut as to define a first side cover section ($C_2$) for the thigh support portion and a second side cover secton ($c_3$) for the buttocks support portion, independently of each other.

Figure 3:
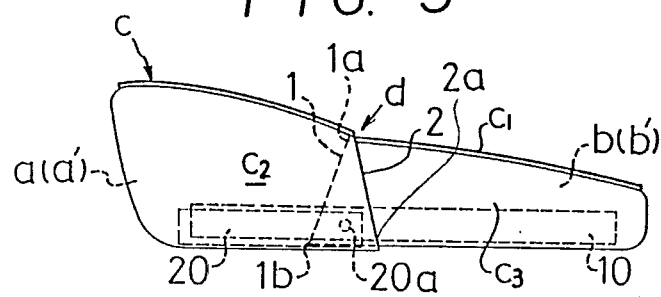
Figure 4:
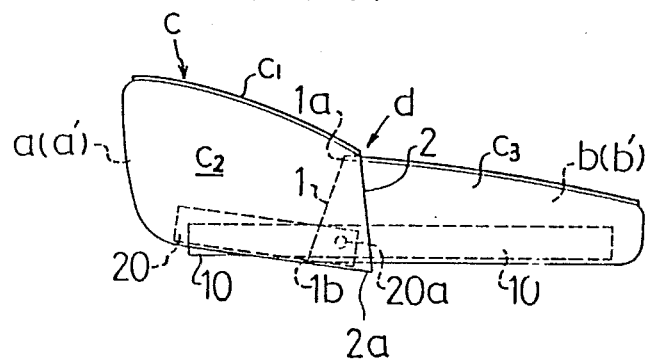

The second side cover section ($c_3$) is fixed at the ends thereof to the inner surface of seat frame (10) by any appropriate method such that the associated portion of top cover member (c) will cover the outer surfaces of buttocks support portion (b) and its corner portions (b'). In FIGS. 3 and 4, (1) designates the sloped edge of the second side cover section ($c_3$) and it is of such an arrangement that the uppermost edge (1a) thereof extends a relatively small distance into the inside of thigh support portion (a) in relation to bending line (d) of the thigh support portion, while the lowermost edge (1b) thereof extends a relatively large distance into the inside of thigh support portion (a) in relation to the pivot point corresponding to bolt (20a) whereby sloped edge (1) extends downwardly, progressively incresing the angle of its inclination towards lowermost edge (1b).

First side cover section ($c_2$) is fixed at the ends thereof to the lower edge portion of movable frame (20) such that the associated portion of top cover member (c) will cover the surfaces of the thigh support portion (a) and its corner portions (a'). Likewise, as in the aforestated second side cover section ($c_3$), first side cover section ($c_2$) has a sloped edge (2) arranged in an opposed relation to said sloped edge (1) such that lowermost edge (2a) extends in a direction toward buttocks support portion (b) in relation to the pivot point corresponding to bolt (20a) whereby sloped edge (2) extends downwardly, progressively increasing the angle of its inclination towards edge (2a).

In view of the above, it will be appreciated that sloped edge (1) and (2), respectively, define a downwardly enlarging edge portion on second side cover section ($c_3$) and on first side cover section ($c_2$) and since such downwardly enlarging edge portion increases its area progressively, proceeding from its uppermost edge down to its lowermost edge, the first and second side cover sections ($c_2$) and ($c_3$) overlap each other in the vicinity of bolt (20a), or the pivot point. This structure, accordingly, prevents the inner parts of the seat from being exposed to the exterior of the seat during the raising of thigh support portion (a).

Figure 5:
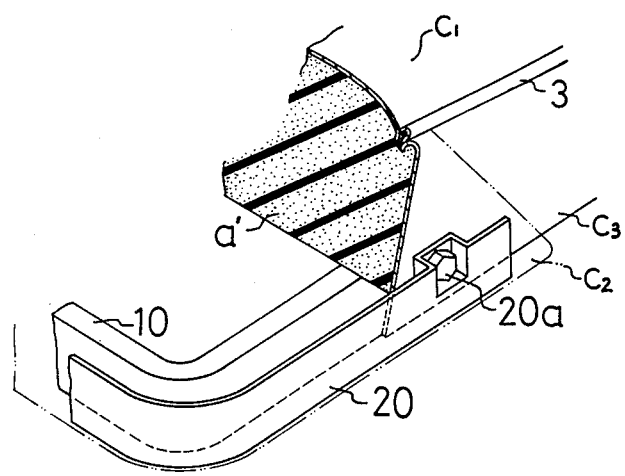
Figure 6:
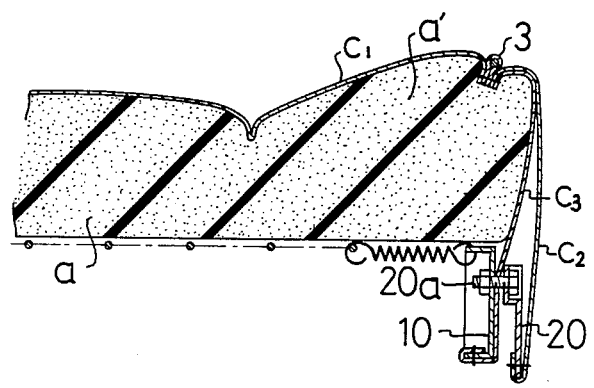

In FIG. 5, (3) designates a decorative seam which connects central cover and/or edge cover section ($c_1$) with side cover section ($c_3$).

Thus, according to the present invention, the thigh support portion and buttocks support portion are integrally formed together with the top cover member and the side cover section of the top cover member is so cut as to define the two separate sections: one section covering the thigh support portion and the other section covering the buttocks support portion. By being so constructed, the present invention permits the execution of such steps for, firstly, fixing one side cover section to the thigh support portion, and secondly, fixing the other side cover section to the buttocks support portion, then completing the affixing the cover member on the seat. Therefore, in comparison with the known type of seat described above, the seat of the present invention is of more simplified construction and facilitates the stretching of the top cover member thereon with a consequent improvement in manufacturing efficiency. Furthermore, the two separately cut structures of the side cover section aid effectively in avoiding a crumple which tends to form on the surface of the top cover member during the process for affixing the top cover member on the seat and hence enables a precise covering of the top cover member on the cushioning member of the seat.

What we claim is:

1. A vehicle seat with a thigh support device, comprising:
    a seat frame having first and second side members;
    a one piece moveable frame overlapping said seat frame and pivotally connected to said first and second side members, said movable frame being vertically moveable by means of a thigh support device;
    a cushioning member made of foam material mounted on the moveable frame and seat frame, said cushioning member having a thigh support portion and a buttocks support portion, both of said support portions being integrally formed together and having a upper surface; and
    a top cover member being continuous and covering said upper surface of said thigh and buttocks support portions in an uninterrupted manner
    said top cover member having two separate side cover sections extending therefrom, a first side cover section for covering said thigh support portion and a second side cover section for covering said buttocks support portion, said side cover sections having edges where said moveable frame is rotatably and pivotally secured to said seat frame, said edge of said first side cover section extends progressively increasing the angle of its inclination from said top cover member towards and terminating at said seat frame adjacent said buttocks support portion, said terminating edge of said first side cover section being fixedly secured to said moveable frame, said edge of said second side cover extends progressively increasing the angle of its inclination from said top cover member towards and terminating at said seat frame adjacent said thigh support portion, said terminating edge of said second side cover section being fixedly secured to said seat frame.

* * * * *